(12) United States Patent
Pradhan et al.

(10) Patent No.: US 9,037,532 B1
(45) Date of Patent: May 19, 2015

(54) CENTRALIZED STORAGE OF STORAGE SYSTEM RESOURCE DATA USING A DIRECTORY SERVER

(75) Inventors: Gyanendra Pradhan, Sunnyvale, CA (US); Bingxue Cai, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1433 days.

(21) Appl. No.: 11/116,679

(22) Filed: Apr. 27, 2005

(51) Int. Cl.
| | | |
|---|---|---|
| *G06F 17/30* | (2006.01) | |
| *G06F 7/00* | (2006.01) | |
| *H04L 29/08* | (2006.01) | |

(52) U.S. Cl.
CPC .... *G06F 17/30589* (2013.01); *G06F 17/30575* (2013.01); *G06F 17/30864* (2013.01); *H04L 67/1097* (2013.01)

(58) Field of Classification Search
CPC .................. G06F 17/30589; G06F 17/30575; G06F 17/30864; G06F 17/30917
USPC ......................................................... 707/104.1
See application file for complete search history.

(56) References Cited

U.S. PATENT DOCUMENTS

| | | | | |
|---|---|---|---|---|
| 2004/0117386 A1* | 6/2004 | Lavender et al. | ............. | 707/100 |
| 2005/0125509 A1* | 6/2005 | Ramachandran | ............. | 709/220 |
| 2005/0234988 A1* | 10/2005 | Messick | ..................... | 707/104.1 |
| 2006/0168344 A1* | 7/2006 | Tsuchiya | ..................... | 709/245 |

* cited by examiner

*Primary Examiner* — Ann Lo
(74) *Attorney, Agent, or Firm* — Gilliam IP PLLC

(57) ABSTRACT

A method for centralized storage and management of resource data associated with storage servers includes operating multiple storage servers, each configured to provide a set of clients with access to data stored in a set of mass storage devices, and using a directory server, which is coupled to the storage servers via a network. The directory server stores and provides access to configuration information for configuring the plurality of storage servers.

18 Claims, 8 Drawing Sheets

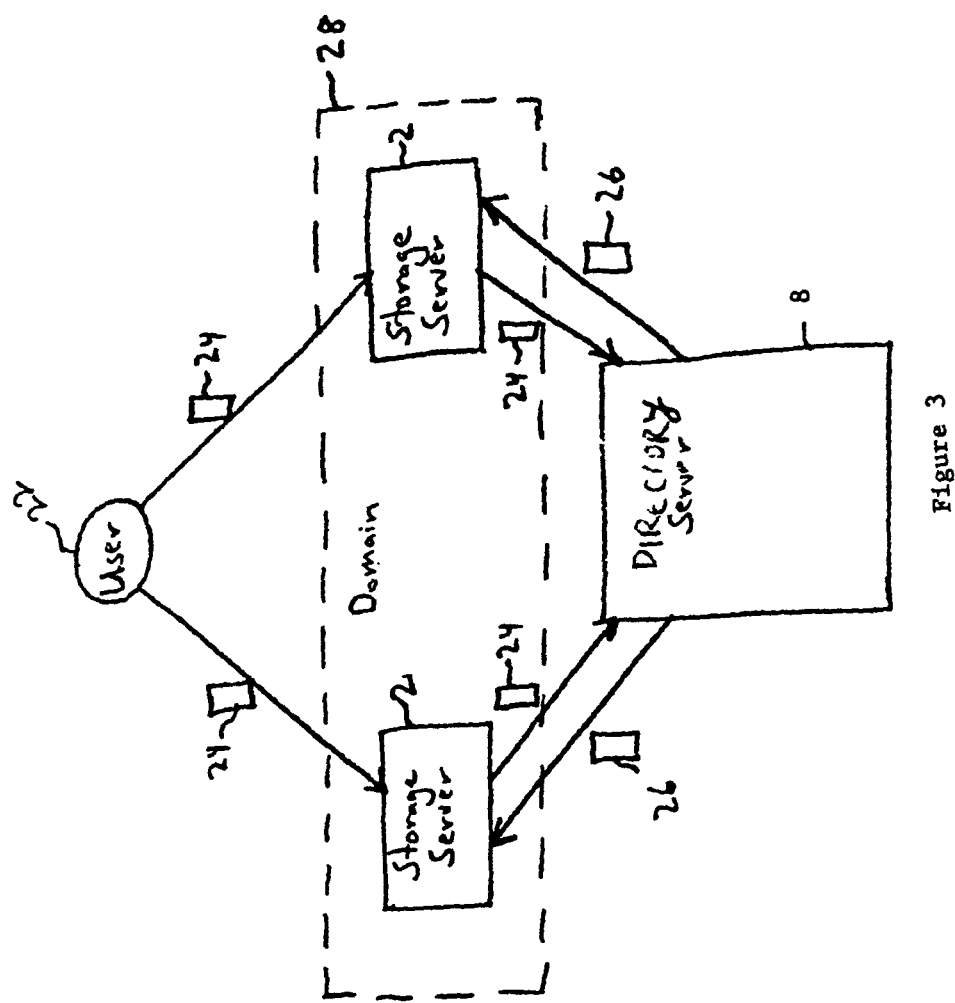

CENTRALIZED STORAGE OF STORAGE SYSTEM RESOURCE DATA USING A DIRECTORY SERVER

FIELD OF THE INVENTION

At least one embodiment of the present invention pertains to storage systems, and more particularly, to centralized storage of storage server resource data using a directory server.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system may include at least one storage server, which is a processing system configured to store and retrieve data on behalf of one or more storage clients ("clients"). In the context of NAS, a storage server may be a file server, sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). Filers are made by Network Appliance, Inc. of Sunnyvale, Calif.

In a SAN context, the storage server provides clients with block-level access to stored data, rather than file-level access. Some storage servers are capable of providing clients with both file-level access and block-level access, such as certain Filers made by Network Appliance, Inc.

Storage servers require resource data for storage and management functions. One example of storage server resource data is configuration data, such as setup data required by a storage server for server configuration. Other examples include file system access control lists, registry settings, event log, audit policies, security, Network File System (NFS) enable option, user home directory settings, session timeout settings, quota setup information, and so on.

In the case of a system having a single storage server, storage and management of the resource data can be handled easily. One such method is to provide localized storage of the storage server's configuration data. Accordingly, each time a storage server requires resource data, such as setup data, it queries a local resource data repository for configuration data. This method provides quick and easy access to the configuration data. Furthermore, the resource data can be updated rather easily, for instance, by an administrator.

However, a business enterprise or other organization that manages large volumes of data may operate multiple storage servers concurrently. These storage servers may be connected to each other through one or more networks. The storage servers and other network components may be managed by one or more network administrators (also called "administrative users" or simply "administrators"), who are responsible for configuring, provisioning and monitoring the storage servers, scheduling backups, troubleshooting problems with the storage servers, performing software upgrades, etc. Administrators can accomplish these management tasks using a separate management console on the network, which is a computer system that runs storage management software application specifically designed to manage a distributed storage infrastructure.

Localized storage of server configuration data is often not desirable in a multiple storage server system. Localized storage of server configuration data often requires that the same data be stored by several storage servers. This requires considerable time and effort not only to input and save the data, but also to update stored data. Often, an administrator must manually change the stored data value on each storage server. Redundant storage of server configuration data also means that storage space is being utilized inefficiently. Furthermore, another disadvantage of localized storage of server configuration data is that it leads to decreased security. For instance, if an administrator must manually delete a user who is no longer authorized from each storage server, then there is a chance that the unwanted user can obtain access to data stored by storage servers from which the user has not been removed.

Another option for storage and management of server configuration data is a Group Policy Object (GPO). In the Windows 2000 operating system, a GPO defines server settings such as registry-based polices, security options, software installation and maintenance options, scripts options, and folder redirection options. In the GPO system, an ACTIVE DIRECTORY® (a trademark of the Microsoft Corporation) service may be used to determine the location of domain/clients resources, such as file system access control lists, registry settings, event log, audit, IP security, and so on. The data associated with these domain/clients resources is however, stored on one or more other files of varying formats on servers known as domain controllers (DC). Such distributed method of storing resource data is disadvantageous in that it often results in redundant data being stored. Furthermore, the files containing the resource data can be accessed only by Common Internet File System (CIFS) clients. Also, if an administrator changes GPO definitions, the clients do not get the updates in a prompt manner since the ACTIVE DIRECTORY® passively waits for clients to communicate with the ACTIVE DIRECTORY® to find out what has been updated and there is no proactive way to notify the clients of updates.

It is desirable, therefore, to provide a solution to the aforementioned problems.

SUMMARY OF THE INVENTION

The present invention includes methods and related apparatus for centralized storage and management of storage server resource data. In one embodiment, the method includes operating directory server which communicates with a plurality of storage servers through a network, and using the directory server to store and manage storage server resource data. In another embodiment, the method includes receiving an update to storage server resource data stored at a directory server. The directory server is configured to store resource data, such as configuration data, associated with a plurality of storage servers.

In another embodiment, the method includes receiving at a storage server selected from a plurality of storage servers, a notification to check for updates at a directory server. The directory server is configured to store configuration data associated with the plurality of storage servers. In response to the notification, the storage server accesses the directory server to receive the updates from the directory server.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 3 shows the use of a centralized network directory server to provide resource data to multiple storage servers;

DETAILED DESCRIPTION

A method and apparatus for centralized storage and management of storage server resource data are described. As described further below, in certain embodiments of the invention, the method includes operating multiple storage servers, each configured to provide a set of clients with access to data stored in a set of mass storage devices, and using a centralized directory server, which is coupled to the storage servers via a network. The centralized directory server is used to store and manage storage server resource data, such as configuration data.

Figure 1:
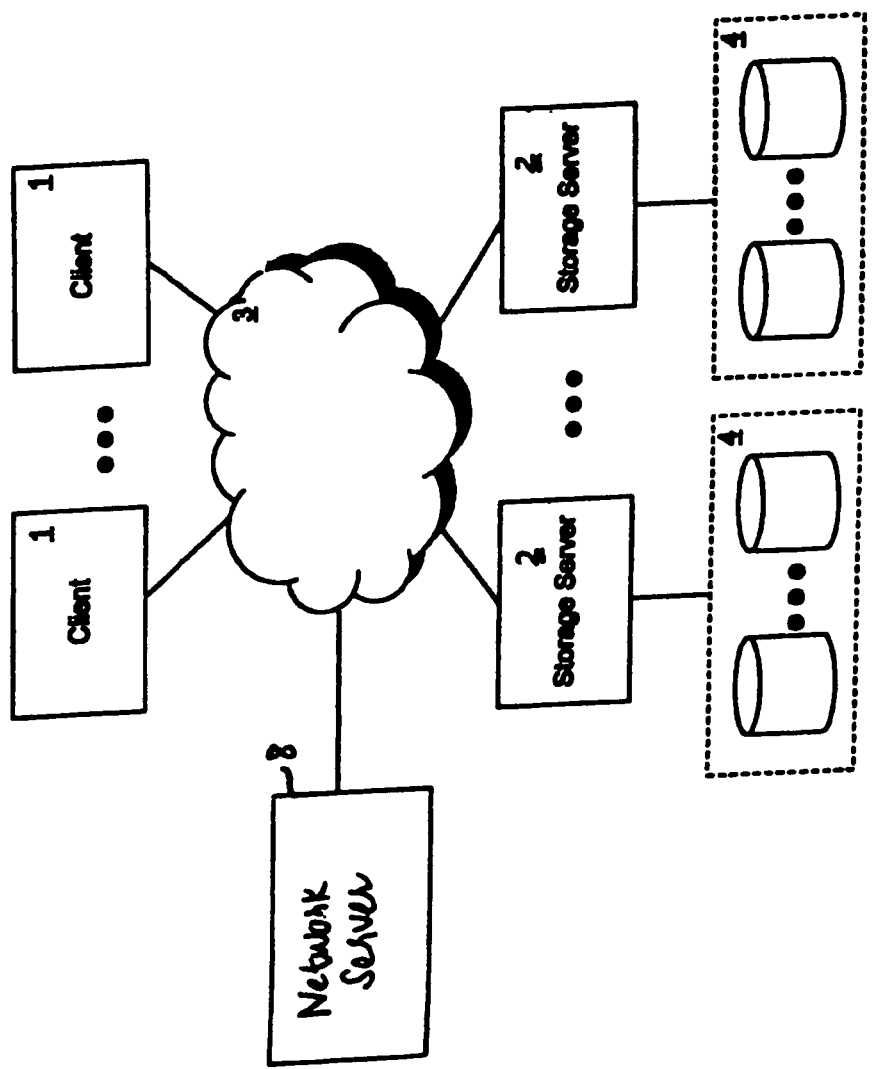
FIG. 1 illustrates a network environment in which the invention can be implemented.

FIG. 1 shows a network environment in which the invention can be implemented. In FIG. 1, a number of storage servers 2 are each coupled locally to a separate storage subsystem 4, each of which includes multiple mass storage devices. Each storage subsystem 4 is managed by its corresponding storage server 2. The storage servers 2 are also coupled through a network 3 to a number of clients 1. Each storage server 2 receives and responds to various read and write requests from the clients 1, directed to data or files stored in or to be stored in the corresponding storage subsystem 4.

Each of the clients 1 may be, for example, a conventional personal computer (PC), workstation, or the like. Each storage server 2 may be, for example, a file server used in a NAS mode (a "filer"), a block-based storage server such as used in a storage area network (SAN), or other type of storage server. The network 3 may be, for example, a local area network (LAN), a wide area network (WAN), a Global Area Network (GAN) such as the Internet, or other type of network or a combination of networks. The mass storage devices in each storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in each storage subsystem 4 can be organized as a Redundant Array of Inexpensive Disks (RAID), in which case the corresponding storage server 2 accesses the storage subsystem 4 using an appropriate RAID protocol. Also connected to the network 3 is a network server 8 for storage of resource data associated with storage servers 2.

In one embodiment of the network, the network server 8 is a directory server. Accordingly, the network server 8 uses a directory service to provide storage and management of storage server resource data. A directory is a specialized database optimized for reading, browsing and searching and tends to contain both descriptive and attribute-based information. A directory schema is typically flexible and helps support sophisticated filtering capabilities. A directory service is thus desirable in that it is tuned to provide quick responses to high-volume search operations. Also, directories generally have the ability to replicate information widely. Furthermore, directory updates tend to be simple all-or-nothing changes.

Currently, several directory services are available. These include directory services based on Open LDAP (Lightweight Directory Access Protocol), ACTIVE DIRECTORY, Novell Directory Services, Sun iPlanet, Netscape Directory Server, IBM Tivoli Directory Server, and so on.

In accordance with certain embodiments of the invention, network server 8 is an LDAP directory server. LDAP is an open network protocol standard designed to provide access to distributed directories. LDAP provides a mechanism for querying and modifying information that resides in a directory information tree (DIT). A directory information tree typically contains a broad range of information about different types of network objects including users, printers, applications, and other network resources. LDAP is described through four basic models: Information, Naming, Functional, and Security. The combination of these models introduces a nomenclature that describes entries and their attributes, and provides methods to query and manipulate their values.

Accordingly, LDAP defines operations for searching and updating a directory. The LDAP search operation is composed of a search base defining the portion of the directory to be searched, a search filter defining the search criteria, and a search scope defining the search depth. LDAP update operations may include adding an entry, deleting an entry, adding an attribute of an entry, deleting or replacing an attribute of an entry, renaming an entry, and so on.

In accordance with certain embodiments of the invention, the LDAP server 8 is used to save data associated with storage server resource data, for example, configuration data, in a centralized fashion, as described below:

Options/Settings
NFS enable option: on\off
User home directory: <string>
Session timeout: <integer>
Configurations
Quota Setup
Security
Audit policies
Unix user and Windows user information Accordingly, in certain embodiments of the invention, the LDAP server 8 is used as both a central repository to store the server resources and a directory service to access the server resources stored on the repository. Accordingly, for example, server setup data can be saved on the LDAP server 8. When a storage server 2 boots up, it will query the LDAP server 8 for its setup information. Based on the setup data received from the LDAP server 8, the storage server 2 can automatically configure itself. This eases the administrator's job to configure each server one by one.

Figure 2:
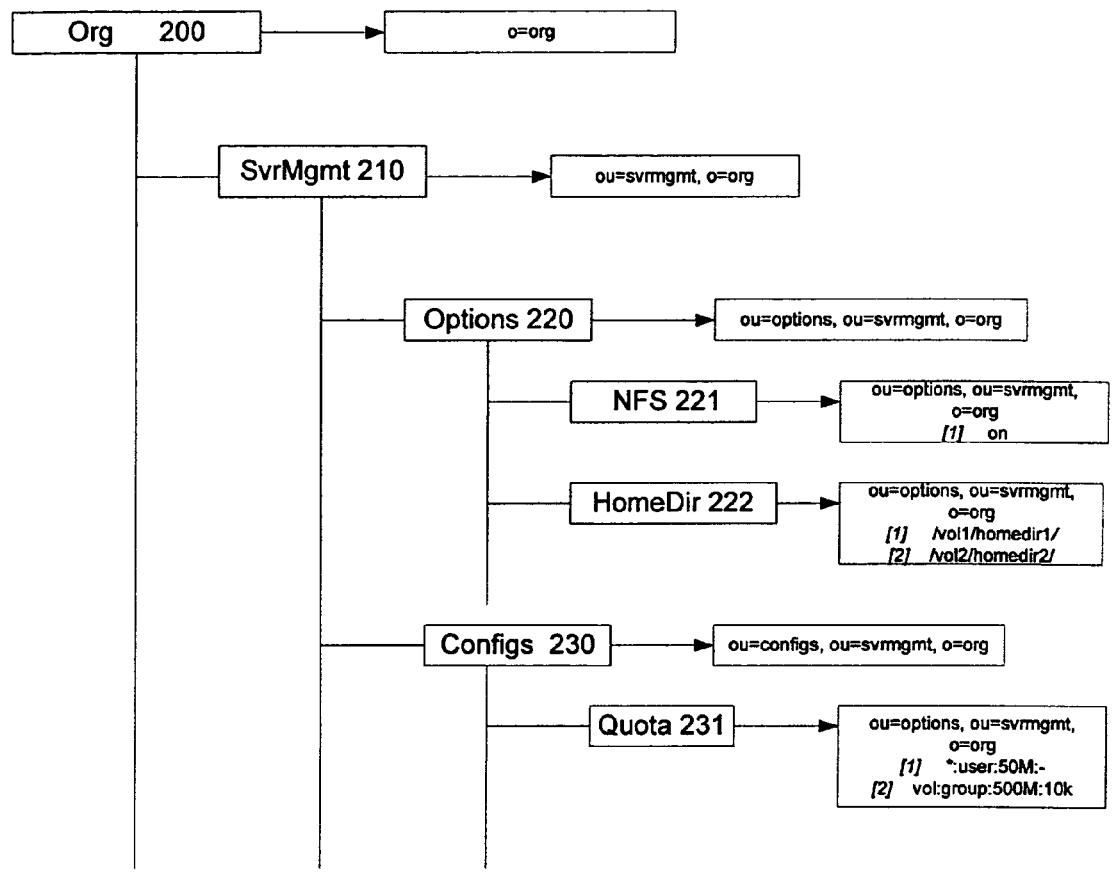
FIG. 2 shows an example of data format as used in an LDAP directory.

FIG. 2 shows an example of a data format as used in an LDAP server 8. In LDAP, directory entries are arranged in a tree-like structure. Each entry is a collection of attributes and has a unique name, known as a Distinguished Name (DN). Each attribute has a type and one or more values associated with it. A type is usually a mnemonic string. For instance, the type "o" stands for organization, "ou" stands for organizational unit within the organization, "cn" stands for common name, and so on.

As illustrated in FIG. 2, the organization tree "o=Org" 200 has a first branch of "ou=srvrmgmt" 210. As the name indicates, this branch contains server management resource data. The branch "ou=srvrmgmt" 210 has several branches of its own, including one for "ou=options" 220. This branch has several sub-branches, including "cn=nfsenable" 221, and "cn=homedir" 222. The sub-branch "cn=nfsenable" 221 may contain such attributes as "on", indicating that NFS is enabled. The sub-branch "cn=homedir" 222 may also contain attributes. For instance, a first attribute may be "/vol1/homedir1/" and a second attribute may be "/vol2/homedir2/", indicating that there are two home directories on the server. The branch "ou=srvrmgmt" 210 also includes the branch "ou=Configs" 230, which stores configuration data, such as "cn=quotas" 231.

In accordance with certain embodiments of the invention, as illustrated in FIG. 3, a network domain 28 is defined to include a group of storage servers 2 on behalf of which the directory server 8 is to provide centralized storage and management of storage server resource data. In one embodiment, an administrator can set up the directory server 8 to contain storage server resource data. On first boot for a storage server 2, the administrator will set an option which points to the LDAP server 8. From then on, any resource data request 24 sent to a storage server 2 by a user 22 will be forwarded to the LDAP server 8, with the result 26 returned by the directory server 8 to the storage server 2.

Figure 4A:
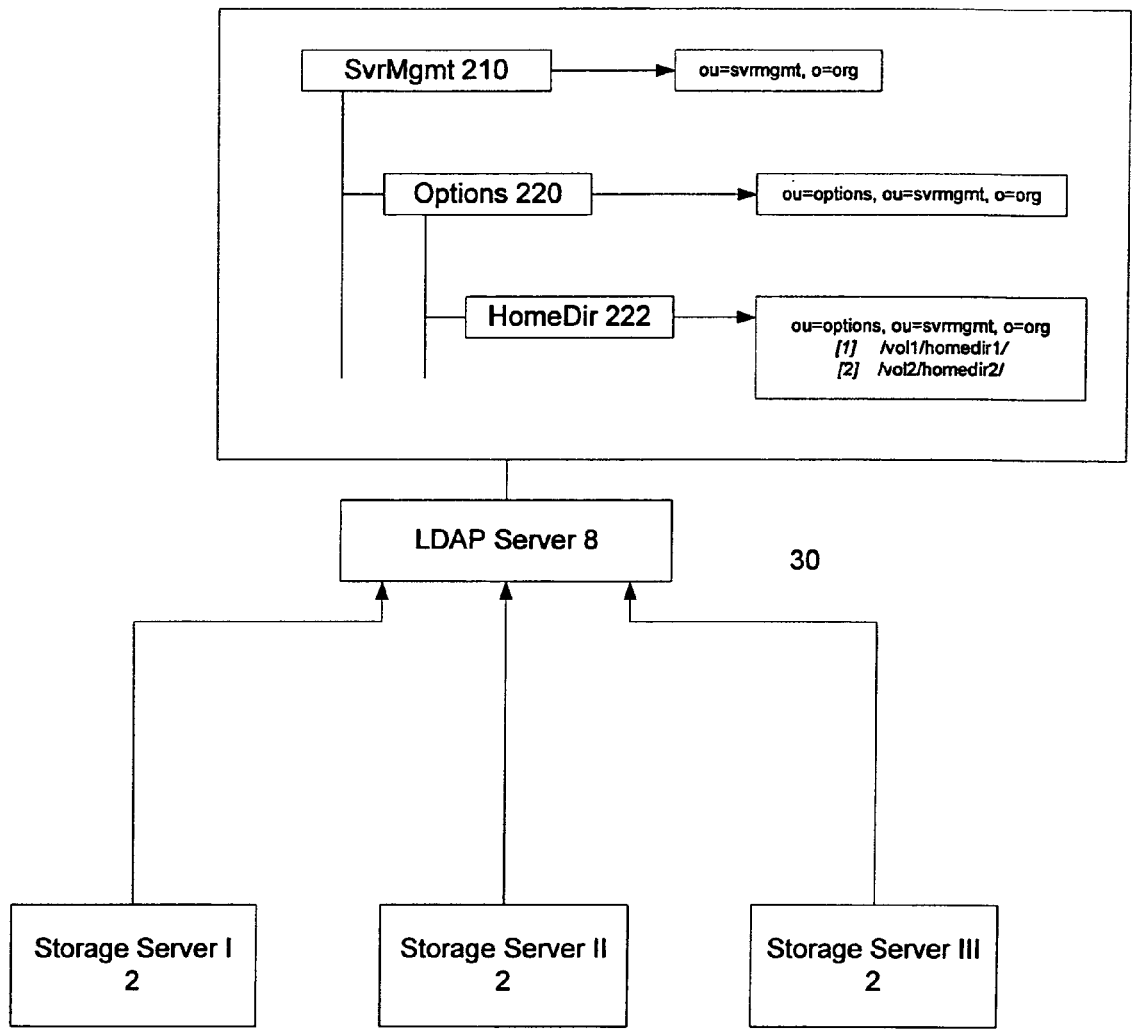
FIG. 4A shows an example of storage servers querying an LDAP server for data.
Figure 4B:
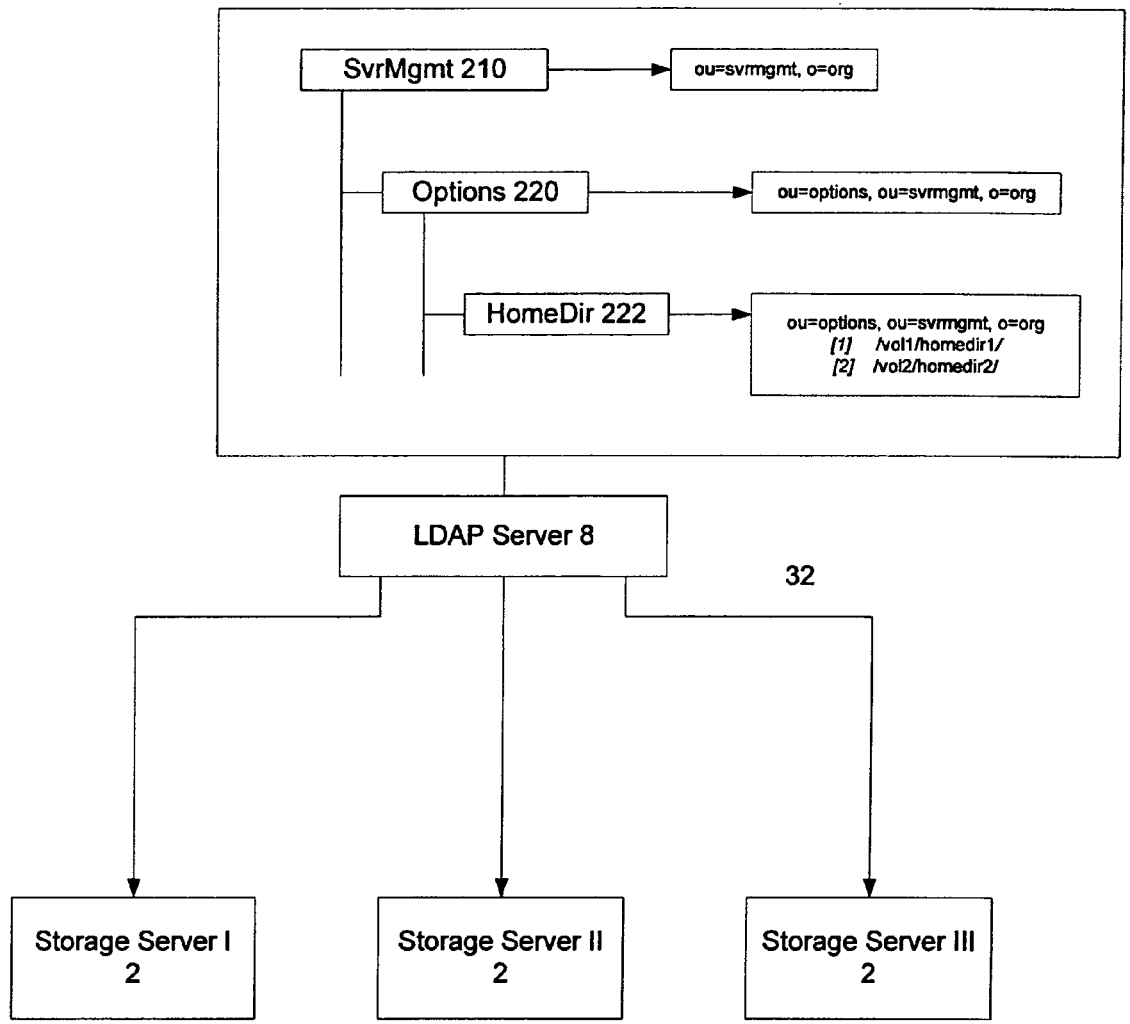
FIG. 4B shows an example of storage servers receiving data from an LDAP server.

FIG. 4A illustrates file servers 2 requesting data from the LDAP server 8. A resource data request 30 querying the LDAP server 8 about home directory settings is forwarded from the file servers 2 to the LDAP server 8. FIG. 4B illustrates the file servers 2 receiving home directory settings information 32 from the LDAP server 8.

In one embodiment, updates to the storage server resource data stored by LDAP server 8 can come from several sources depending on system configuration. The updates may be made to the LDAP server 8 in response to an input by an administrator through a storage server management console. In an alternate embodiment, the updates may be made to the LDAP server 8 in response to an input by an administrator through a 3rd party management console installed on the machine on which the LDAP server runs.

Figure 5:
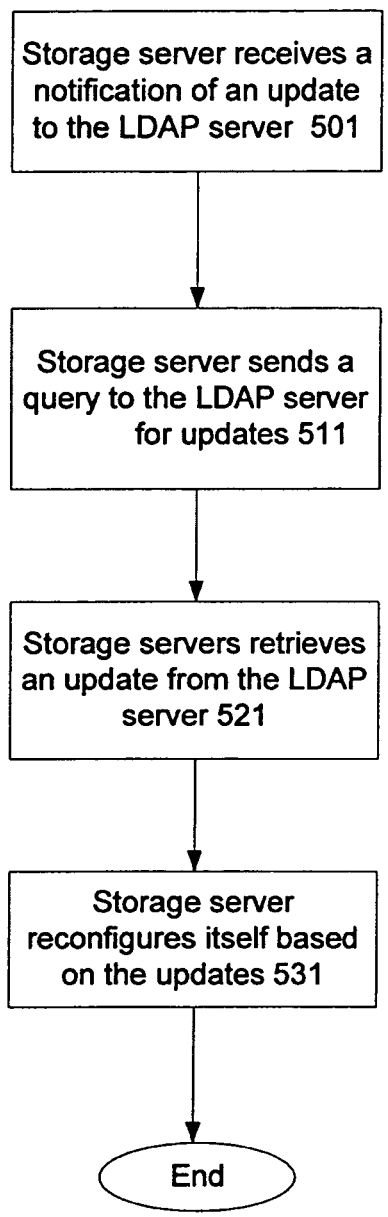
FIG. 5 is a flow diagram showing a process performed by a storage server to retrieve updates to the storage server resource data.

FIG. 5 shows an example of the overall process which may be performed by a storage server 2 to receive the updates made to the storage server resource data. At block 501, a storage server 2 receives a notification of an update to the LDAP server 8. The notification may be received from another storage server 2, from the storage server Management Console, or from the 3rd party management console. In one embodiment, the 3rd party management console watches over LDAP server activities and sends out notifications to the storage servers 2 when necessary.

In one embodiment, the notification of the update includes such data regarding the updates so as to enable the storage server 2 receiving the indication to determine a priority of accessing the LDAP server 8 to receive the update. For instance, if the indication of the updates indicates a user being deleted from the storage system, then the storage server can determine a high priority of accessing the LDAP server 8 to receive the user deletion update. On the other hand, if the indication of the updates indicates a change in memory space quota from, for instance, 50 MB to 51 MB, the storage server can determine a lower priority of accessing the LDAP server 8 to receive the quota change update.

At block 511, the storage server sends a query to the LDAP server 8 for the updates. Optionally, before sending the query to the LDAP server 8, the storage server may determine an update priority based on the indication of the update received from the LDAP server 8. At block 521, the storage server 2 retrieves an update from the LDAP server 8. At block 531, the storage server 2 reconfigures itself based on the updates to the settings retrieved from the LDAP server 8.

Figure 6:
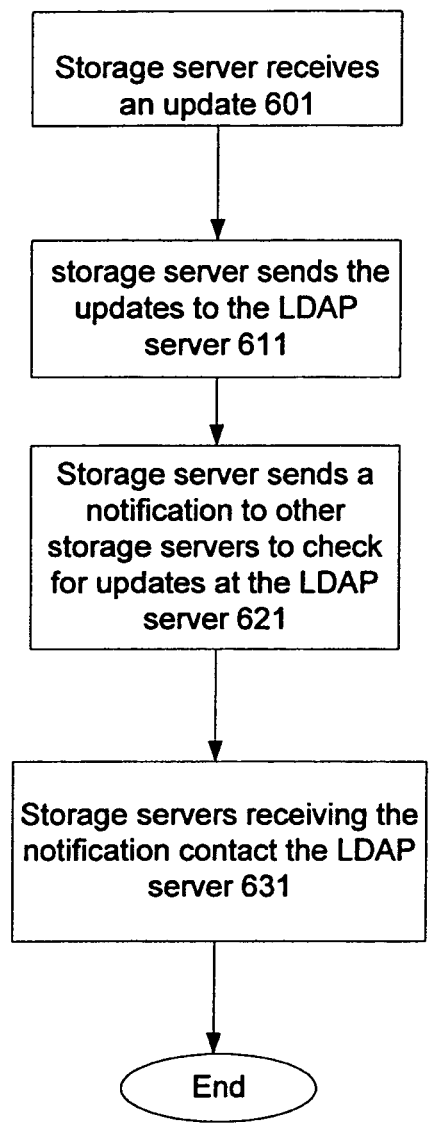
FIG. 6 is a flow diagram showing a process performed by a storage server to cause other storage servers to retrieve updates to the directory server.

FIG. 6 shows an example of the overall process which may be performed by a storage server 2 to cause other storage servers to retrieve the updates to the storage server resource data from the LDAP server 8. Initially, at block 601 in FIG. 6, the storage server 2 setup is updated by an administrator through the storage server management console. In another embodiment, the administrator updates the storage server 2 setup through the 3rd party management console installed on LDAP server.

At block 611, the storage server management console sends the updates to the LDAP server 8. In one embodiment, the management console of the storage server receives a response back from the LDAP server 8 indicating whether the update is successful.

At block 621, if the update is successful, the storage server 2 management console sends a notification to other storage servers to check for updates at the LDAP server 8. In one embodiment, the storage server 2 sends the notification to all the storage servers in the storage system. In another embodiment, the storage server 2 sends the notification to those storage servers deemed to require the update. In one embodiment, the storage server 2 determines which storage servers require the update by querying the LDAP server 8. In another embodiment, the 3rd party management console sends the notification to the storage servers.

In one embodiment, a storage server receiving the notification discards the notification if it is determined to have been previously received. In one embodiment, the notification is time-stamped. Accordingly, if the storage server receiving the time-stamped notification determines it to have the same or an older time stamp than a stamp stored on the storage server, the notification is discarded. In another embodiment, the notification can carry information about what has been updated. For instance, the notification may carry the information that the user home directory has been updated. Accordingly, upon receiving the notification, the storage server only needs to query for changes to the home directory instead of querying overall changes. This is advantageous in reducing the network traffic and in speeding up the updates. At block 631, the storage servers receiving the notification from the storage server 2 queries the LDAP server 8 in order to retrieve the update from the LDAP server 8. In one embodiment, the storage servers retrieve the update from the LDAP server 8 in accordance with the process exemplified in FIG. 5.

Figure 7:
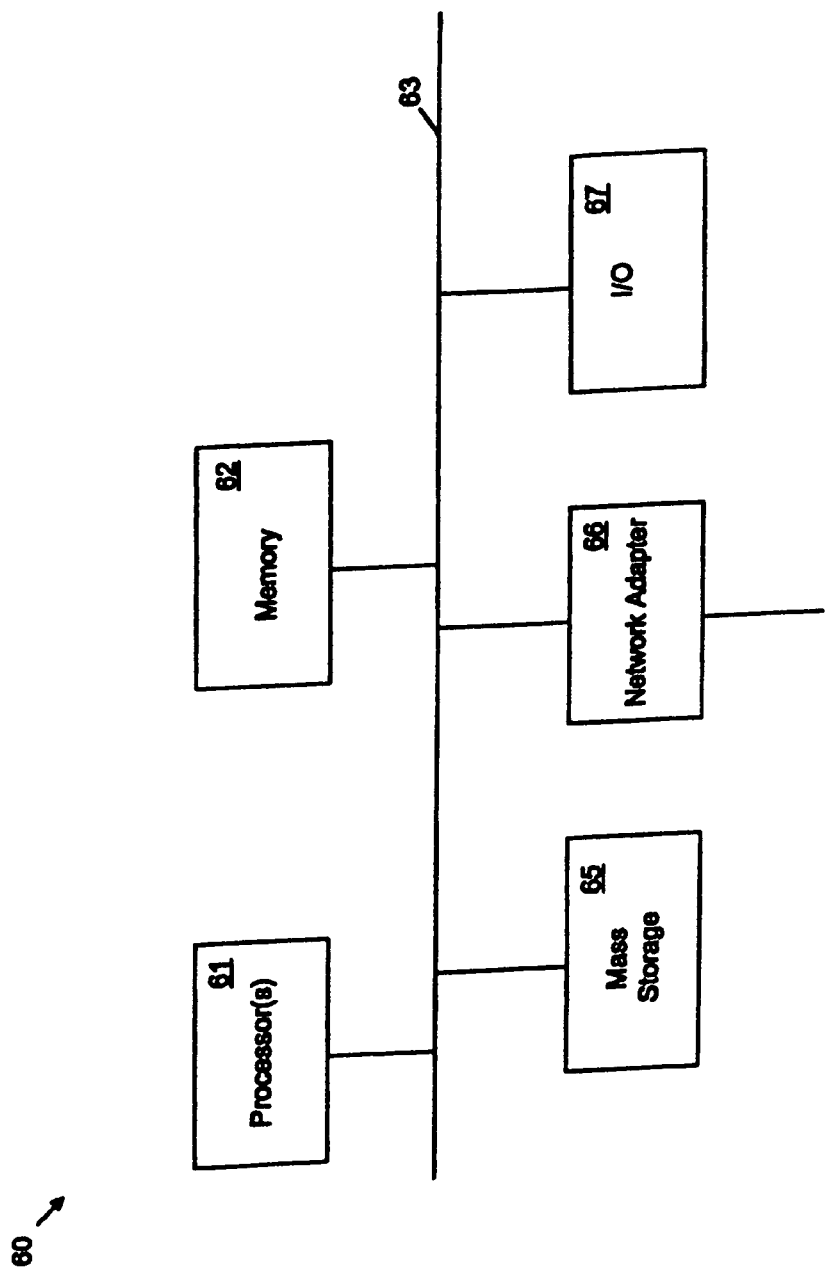
FIG. 7 is a high-level block diagram of a processing system.

As indicated above, the techniques introduced herein can be implemented in software, either in whole or in part. FIG. 7 is a high-level block diagram showing an example of the architecture of a processing system, at a high level, in which such software can be embodied. In certain embodiments, the processing system 60 is a storage server 2. In other embodiments, the processing system 60 is a network directory server or other form of processing system. Note that certain standard and well-known components which are not germane to the present invention are not shown.

The processing system 60 includes one or more processors 61 and memory 62, coupled to a bus system 63. The processors 61 are the central processing units (CPUs) of the processing system 60 and, thus, control its overall operation. In certain embodiments, the processors 61 accomplish this by executing software stored in memory 62. A processor 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 represents any form of random access memory (RAM), read-only memory (ROM), flash memory, or the like, or a combination of such devices. Memory 62 includes the main memory of the processing system 60. Memory 62 may store software which implements the techniques introduced above.

The bus system 63 shown in FIG. 8 is an abstraction that represents any one or more separate physical buses and/or point-to-point connections, connected by appropriate bridges, adapters and/or controllers. The bus system 63, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

Also connected to the processors 61 through the bus system 63 are one or more internal mass storage devices 65, and a network adapter 66. Internal mass storage devices 65 may be or include any conventional medium for storing large volumes of data in a non-volatile manner, such as one or more magnetic or optical based disks. The network adapter 66 provides the processing system 60 with the ability to communicate with remote devices (e.g., clients 1) over a network and may be, for example, an Ethernet adapter, a Fibre Channel adapter, or the like. The processing system 60 may also include one or more input/output (I/O) devices 67 coupled to the bus system 63. The I/O devices 67 may include, for example, a display device, a keyboard, a mouse, etc. If the processing system 60 is a storage server 2, it may include a storage adapter (not shown), such as a Fibre Channel adapter or a SCSI adapter, to allow the storage server 2 to access a set of mass storage devices.

Thus, a method and apparatus for centralized storage and management of storage server resource data, such as configuration data, have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for operating a storage server, the method comprising:
    querying, by the storage server, a Lightweight Directory Access Protocol (LDAP) directory server located in a centralized location for server setup data during a boot-up time as the storage server is booting up, the server setup data stored at the directory server under a branch of a directory tree comprising directory entries arranged in a tree-like structure, and the server setup data comprising a directory entry indicative of whether a Network File System (NFS) is enabled at the storage server;
    automatically configuring the storage server itself with the server setup data during the boot-up time;
    receiving a notification to check for updates made to configuration data of the storage server, the configuration data stored at the directory server under the branch of the directory tree and comprising a directory entry indicative of a memory space quota of the storage server;
    based on information in the notification, determining a priority for accessing the directory server to receive the updates; and
    informing other storage servers to retrieve the updates from the directory server.

2. The method as recited in claim 1, further comprising:
    updating the configuration data stored in the directory server.

3. The method as recited in claim 2, further comprising updating the configuration data stored in the directory server in response to an input from an administrator.

4. The method as recited in claim 2, further comprising updating the configuration data stored in the directory server in response to an input from the storage server.

5. The method as recited in claim 2, further comprising:
    transferring updates to the configuration data from the directory server to the storage server upon the directory server receiving a request from the storage server.

6. A storage server comprising:
    a processor;
    a network adapter through which to communicate with a plurality of storage servers; and
    a memory containing instructions therein to cause the processor to:
    query a Lightweight Directory Access Protocol (LDAP) server located in a centralized location for server setup data during a boot-up time as the storage server is booting up, the server setup data stored at the directory server under a branch of a directory tree comprising directory entries arranged in a tree-like structure, and the server setup data comprising a directory entry indicative of whether a Network File System (NFS) is enabled at the storage server;
    automatically configure the storage server itself with the server setup data during the boot-up time;
    receive a notification to check for updates made to configuration data of the storage server, the configuration data stored at the directory server under the branch of the directory tree and comprising a directory entry indicative of a memory space quota of the storage server;
    based on information in the notification, determine a priority for accessing the LDAP server to receive the updates; and
    inform other storage servers to retrieve the updates from the LDAP server.

7. The storage server as recited in claim 6, wherein the notification is received from an administrator.

8. The storage server as recited in claim 6, wherein the notification is received from one of the plurality of storage servers.

9. The storage server as recited in claim 6, wherein the notification is received from a third party management console on the LDAP server.

10. The storage server as recited in claim 6, wherein the memory containing instructions therein further causes the processor, in response to the notification, to access the LDAP server to determine storage servers from the plurality of storage servers that require the updates and notify the storage servers determined as requiring the updates regarding the updates at the LDAP server.

11. The storage server as recited in claim 6, wherein the memory containing instructions therein further causes the processor to reconfigure the storage server based on the updates received from the LDAP server.

12. A directory server comprising:
a processor;
a network adapter through which to communicate with a plurality of storage servers; and
a memory containing instructions therein to cause the processor to:
store, at the directory server, server setup data and configuration data under a branch of a directory tree in compliance with the Lightweight Directory Access Protocol (LDAP), the directory tree comprising directory entries arranged in a tree-like structure, both of the server setup data and the configuration data associated with each of the plurality of storage servers, the server setup data comprising a directory entry indicative of whether a Network File System (NFS) is enabled at each storage server and the configuration data comprising a directory entry indicative of a memory space quota of each storage server;
receive queries from the storage servers for the server setup data during a boot-up time as the storage servers are booting up;
return the server setup data to enable the storage servers to automatically configure themselves with the server setup data; and
in response to an update to the configuration data, send a notification of the update from the directory server to one or more of the plurality of the storage servers to enable each of the one or more storage servers to locally implement the update, the notification to include data to enable the storage servers to determine a priority for accessing the directory server to receive the update.

13. The directory server as recited in claim 12, wherein the update to the configuration data stored in the directory server is received in response to an input from an administrator.

14. The directory server as recited in claim 12, wherein the update to the configuration data stored in the directory server is received in response to an input from one of the storage servers.

15. The directory server as recited in claim 12, further comprising receiving a request from a first storage server to transfer the update.

16. The directory server as recited in claim 15, further comprising sending the update to the configuration data to the first storage server.

17. A storage server comprising:
a processor;
a network adapter through which to communicate with a plurality of storage servers; and
a memory containing instructions therein to cause the processor to:
query a Lightweight Directory Access Protocol (LDAP) server located in a centralized location for server setup data during a boot-up time as the storage server is booting up, the server setup data stored at the directory server under a branch of a directory tree comprising directory entries arranged in a tree-like structure, and the server setup data comprising a directory entry indicative of whether a Network File System (NFS) is enabled and the number of home directories at the storage server;
automatically configure the storage server itself with the server setup data during the boot-up time;
receive a notification to check for updates made to the configuration data of the storage server, the configuration data stored at the directory server under the branch of the directory tree, and comprising a directory entry indicative of a memory space quota and security configuration of the storage server;
based on information in the notification, determine a priority of accessing the LDAP server to receive the updates; and
inform other storage servers of the plurality of storage servers to retrieve the updates from the LDAP server,
wherein deletion of a user from the storage server has a higher priority than a change of memory space quota.

18. The method as recited in claim 1, wherein an additional notification is sent out in response to a successful update response.

* * * * *